(12) United States Patent
Frank (10) Patent No.: US 11,084,102 B2
(45) Date of Patent: Aug. 10, 2021

(54) METAL CUTTING TOOL WITH COOLANT SUPPLY

(71) Applicant: SANDVIK INTELLECTUAL PROPERTY AB, Sandviken (SE)

(72) Inventor: Peter Frank, Floh-Seligenthal (DE)

(73) Assignee: Sandvik Intellectual Property AB, Sandviken (SE)

(*) Notice: Subject to any disclaimer, the term of this patent is extended or adjusted under 35 U.S.C. 154(b) by 0 days.

(21) Appl. No.: 15/755,638

(22) PCT Filed: Jun. 29, 2016

(86) PCT No.: PCT/EP2016/065138
§ 371 (c)(1),
(2) Date: Feb. 27, 2018

(87) PCT Pub. No.: WO2017/036630
PCT Pub. Date: Mar. 9, 2017

(65) Prior Publication Data
US 2018/0250753 A1  Sep. 6, 2018

(30) Foreign Application Priority Data

Aug. 31, 2015 (EP) ..................................... 15183143

(51) Int. Cl.
*B23B 29/034* (2006.01)
*B23B 27/10* (2006.01)
*B23C 5/28* (2006.01)

(52) U.S. Cl.
CPC ........ *B23B 27/10* (2013.01); *B23B 29/03407* (2013.01); *B23C 5/28* (2013.01); *B23B 2250/12* (2013.01); *B23C 2250/12* (2013.01)

(58) Field of Classification Search
CPC .............. B23B 27/10; B23B 29/03407; B23B 2250/12; B23B 29/0341; B23B 29/034; B23B 2231/24; B23C 5/28; B23C 2250/12
USPC .................................................. 408/147–186
See application file for complete search history.

(56) References Cited

U.S. PATENT DOCUMENTS

2008/0124180 A1  5/2008  Breisch

FOREIGN PATENT DOCUMENTS

| CN | 201172110 Y | 12/2008 |
| JP | H04067907 U | 6/1992 |
| JP | 2005034954 A | 2/2005 |
| JP | 2007111779 A | 5/2007 |
| WO | 9014913 A | 12/1990 |

(Continued)

*Primary Examiner* — Eric A. Gates
*Assistant Examiner* — Paul M Janeski
(74) *Attorney, Agent, or Firm* — Corinne R. Gorski (57) ABSTRACT

A metal cutting tool includes a main tool body and a slider element received at least partially in the main tool body and arranged movably relative. The slider element has a cutting edge or supports a cutting insert having a cutting edge. An internal coolant supply is arranged to supply coolant from the main tool body to the cutting edge and has a coolant channel running within the main tool body and within the slider element. The main tool body, or a transfer element that has the coolant channel being part of the internal coolant supply and connected with the main tool body, includes a first sealing surface on which an outlet of the coolant channel of the main tool body is arranged. The slider element, or the transfer element, includes a second sealing surface on which an inlet of the coolant channel of the slider element is arranged.

16 Claims, 10 Drawing Sheets

(56) References Cited

FOREIGN PATENT DOCUMENTS

| WO | 9855254 A | 12/1998 |
| WO | 2008066473 A1 | 6/2008 |
| WO | 2012123359 A1 | 9/2012 |

METAL CUTTING TOOL WITH COOLANT SUPPLY

RELATED APPLICATION DATA

This application is a § 371 National Stage Application of PCT International Application No. PCT/EP2016/065138 filed Jun. 29, 2016 claiming priority to EP 15183143.5 filed Aug. 31, 2015.

TECHNICAL FIELD

The present invention concerns a metal cutting tool comprising a main tool body, a slider element which is received at least partially in an opening in the main tool body and which is movable relative thereto in an adjustment direction between a first and a second position and which has a cutting edge or is supporting a cutting insert having a cutting edge, and an internal coolant supply being arranged to be able to supply coolant from the main tool body to the cutting edge.

BACKGROUND

Such machining tools have long been known. For example a boring tool is known having a main tool body, at the end of which there is provided a slider element which is adjustable relative to the main tool body, wherein the slider element is movable in the radial direction. The slider element either has a cutting portion provided to come directly into contact with the work piece to be machined, or a seat for receiving a cutting bit.

It is frequent practice to provide an internal coolant supply within the main tool body, which is connected on one end to a coolant pump and on the other end to an opening of the main tool body, in which a nozzle is inserted. The nozzle is directed or baffled so that coolant spray impinges on the cutting edge. Since the cutting edge is located on the slider element, the cutting edge is movable together with the slider element relative to the main tool body and the nozzle thereon. This means that the spray has to cover a wide area for providing coolant to the cutting edge in all positions thereof. In other words, the spray is directed or baffled so that the spray covers all positions of the cutting edge, although the cutting edge is located in a fixed position on the slider element.

Since the direction of the spray beam is not optimally focused towards the cutting edge in any of the positions of the cutting insert, more coolant than necessary has to be pumped through the nozzle.

Therefore, it is desirable that a coolant channel is also provided within the slider element, so that an exit opening of the channel, in which a corresponding nozzle can be inserted, can be provided closer to and in a fixed relationship to the cutting edge. Thus, since the cutting edge is located on the slider element, the cutting edge is moved together with the opening when the slider element is moved. Thereby, the relative position of the opening and the cutting edge will always be constant. Therefore, the spray can be directed to a narrow region encompassing the cutting edge.

WO 2012/123359 A1 discloses a device for internal chips cutting machining with a nozzle for flushing cutter fluid on the cutter. The nozzle is connected with a cutter head and cutter fluid is provided via a tube to the cutter head. The tube runs glidingly relative to the cutter head. This configuration cannot be used for applications, in which coolant under high pressure has to be supplied to the cutting edge, in order to cool the cutting edge and to flush the chips, since the gliding arrangement between the tube and the cutter head is not able to withstand a high pressure fluid for a longer period without leakages.

SUMMARY

Based on the described state of the art, therefore the object of the present invention is to provide a metal cutting tool of the kind set forth in the opening part of this specification, with an improved coolant supply, which can be used also for applications in which coolant with high pressure has to be guided through the coolant channels.

According to the invention, this object is achieved in that the main tool body, or a transfer element that has a coolant channel being part of the internal coolant supply and that is connected with the main tool body, includes a first sealing surface on which an outlet of the coolant channel of the main tool body is arranged; the slider element, or a transfer element that has a coolant channel being part of the internal coolant supply and that is connected with the slider element, includes a second sealing surface on which an inlet of the coolant channel of the slider element is arranged; and in that there is provided a clamping element with which the first and the second sealing surfaces are pressable against each other, whereby a sealed connection between the outlet of the coolant channel of the main tool body and the inlet of the coolant channel of the slider element is provided.

For example, the clamping element can be a clamping screw which is guided in a threaded hole of the main tool body and rests on the slider element. By turning the clamping screw the second sealing surface of slider element is pressed against the first sealing surface of the main tool body. Due to the inventive measure that a clamping element is provided with which the two sealing surface are pressable against each other, a sealed connection can be provided between the main tool body and the slider element.

According to a preferred embodiment the main tool body includes the transfer element, wherein the coolant channel of the transfer element includes an inlet and outlet, the first sealing surface and the outlet of the main tool body are arranged on the transfer element, the outlet of the coolant channel of the transfer element constitutes the outlet of the main tool body, and wherein the inlet of the coolant channel of the transfer element is in connection with the coolant channel of the main tool body.

The transfer element can be connected to the main tool body by every conceivable means. It is still possible that the main tool body and the transfer element are integrally formed. Then, the transfer element is preferably flexible or pliable, so that the transfer element is easily pressable against the slider element.

In this embodiment the clamping element is pressing the first sealing surface on the transfer element against the second sealing surface on the slider element. Thereby, a sealed connection can be provided between the outlet of the transfer element and the inlet of the coolant channel of the slider element.

For example, the inlet of the coolant channel of the slider element and the outlet of the coolant channel of the transfer element can be located vis a vis each other, whereby a sealed connection is established once they are firmly pressed against each other.

As stated above, the clamping element can be a clamping screw, which is guided in a threaded hole of the main tool body and rests on the transfer element. In another embodiment the clamping element is a wedge which is arranged between the main tool body and the transfer element and which is movable, so that by moving of the wedge the force exerted by the wedge onto the transfer element can be varied.

According to a preferred embodiment, the transfer element and the main tool body includes cooperating sealing surfaces, which sealing surfaces accommodate the inlet of the transfer element and an opening of coolant channel of the main tool body, respectively. The sealing surfaces with the inlet and the opening are such arranged that, when the first and the second sealing surfaces are pressed against each other, also the opposing sealing surfaces of the transfer element and the main tool body are pressed against each other. Thereby, a sealed fluid connection between the transfer element and the main tool body is provided.

The inlet and the outlet of the transfer element can be located on the same sealing surface.

Advantageously, a sealing element is arranged between the transfer element and the main tool body and/or between the transfer element and the slider element, wherein the sealing element provides a sealed connection between the inlet of the transfer element and the coolant channel of the main tool body and/or the outlet of the transfer element and the coolant channel of the slider element, respectively.

For example, the sealing element can be an O-ring, which is preferably located in a corresponding groove provided in the transfer element. For example, the groove can surround the outlet. In a further preferred embodiment a further sealing element surrounding the inlet is provided. The groove can also be provided at the slider element and/or the main tool body.

By providing for a sealing element the pressing force with which the transfer element has to be pressed against the slider element, in order to obtain a sealed connection, can be reduced.

In a preferred embodiment, the sealing element is arranged to encompass the outlet of the transfer element and the inlet of the coolant channel of the slider element. In particular, the sealing element may encompass the respective outlet and inlet with ample space along the sealing interface, such that the inlet of the coolant channel of the slider element always remains within the border line defined by the inner periphery of the sealing element independently of the actual position of the slider element.

The transfer element can be a cylindrical body or a substantially cylindrical body, which is arranged within an opening of the main tool body. For example, the transfer element can be a cylindrical body which is arranged within a bore provided in the main tool body. In such an embodiment, the coolant channel can be arranged in axial direction within the cylindrical body, wherein the outlet and preferably also the inlet is/are arranged on the outer circumference.

The transfer element can be a substantially cylindrical body having an outer section with a flattened section of the cylindrical surface forming the first sealing surface. The slider element includes a corresponding flattened surface forming the second sealing surface, on which the inlet of the coolant channel of the slider element is arranged. Preferably, the cross section of the opening of the main tool body, which opening receives the transfer element, is adapted to the cross section of the transfer element in that the opening includes a corresponding flattened surface. This flattened surface in the main tool body opening constitutes the one of the cooperating sealing surfaces on which the opening of the coolant channel of the main tool body is arranged.

The flattened surface of the transfer element and the corresponding flattened surfaces of the slider element and of the opening of the main tool body are facing each other, so that, by means of the clamping element, the flattened surfaces are pressable against each other for providing a sealed connection of the coolant channels of the involved elements.

The axis of the cylindrical body or of the substantially cylindrical body of the transfer element and the adjustment direction of the slider element are forming an angle larger than 0° and preferably larger than 50° and most preferably larger than 75°. In a preferred embodiment the angle measures 90°.

The main tool body can comprise two parts, wherein the first part of the main tool body has a shaft for connection with a machine and the second part of the main tool body is mountable at the first part of the main tool body in at least two different positions, wherein the coolant channels of the coolant supply run at least within the second part of the main tool body.

In a further preferred embodiment, the tool includes a drive shaft having two threaded portions, wherein the slider element and the main tool body each have a respective threaded portion, wherein the first threaded portion of the drive shaft cooperates with the threaded portion of the slider element and the second threaded portion of the drive shaft cooperates with the threaded portion of the main body in such a way that when the drive shaft is rotated about its axis the slider element, the slider element is moved in the adjustment direction relative to the main body between the first and second positions.

By virtue of such an arrangement, rotation of the drive shaft involves a translatory movement of the drive shaft with respect to the main tool body. The relative movement of the slider element with respect to the main tool body is therefore determined by the addition of the relative movements between the slider element and the drive shaft, on the one hand, and between the drive shaft and the main tool body, on the other hand.

In such a preferred embodiment, the tool includes further an anti-rotation element which is movable into contact with the slider element, in order to prevent rotation of the slider element within the opening of the main tool body around the axis of the slider element, which would also be the axis of any threaded portion thereof. In particular, if the slider element has a section with a cylindrical shape which is positioned within a bore hole within the main tool body, such an anti-rotation element is useful to prevent a rotation of the slider element around the axis of this cylindrical section. For example, the anti-rotation element can have a locking member which can be inserted into a recess of the slider element. This recess can be a groove in the outside of the slider element.

In a preferred embodiment, a positioning device is provided which is movable into contact with the transfer element, wherein the main tool body includes an elastic element, preferably a rubber ball, forming a resilient abutment for the transfer element in the positioning direction. For positioning the transfer element, the latter is urged against the elastic element by means of the positioning device when moved in contact with the transfer element. For example, the positioning element and the elastic element can be arranged so that the transfer element can be moved along the axial direction into a position in which the inlet of the coolant channel of the transfer element and the opening of the coolant channel of the main tool body as well as the outlet of the coolant channel of the transfer element and the inlet of the coolant channel of the slider element are located vis a vis each other on their respective sealing surfaces that form the coolant transfer interface.

Then, a sealed connection of the coolant channels can be achieved by means of the clamping device pressing the sealing surfaces together.

By using the elastic element there is provided a kind of floating-support, because even after the transfer element has been set into the desired position (in the positioning direction) the transfer element can still be moved and pressed against the tool body and the slider element by the clamping element.

Preferably, the positioning device, the elastic element and the transfer element are arranged and dimensioned such that the transfer element is pressable towards the tool body and the slider element along a sealing direction perpendicular to the adjustment direction against the elastic element.

In a further preferred embodiment, the anti-rotation element is further used as the positioning device, wherein preferably the anti-rotation element includes a wedge-shaped section, wherein when the anti-rotation element is moved the wedge-shaped section is pressable against the transfer element, so that the transfer element is pressed against the elastic element.

The positioning device and therefore the wedge-shaped section can be moved perpendicular to the axis of the transfer element, so that by moving the positioning device the wedge-shaped section presses against an end surface of the transfer element, so that the transfer element is positioned in an axial direction. For example, the positioning device can be arranged within a bore in the main tool body and can have a threaded section engaging a corresponding internal thread of the main tool body, so that turning the threaded section of the positioning device will move the wedge shaped section.

In other words, the transfer element is clamped between the elastic element and the wedge-shaped section of the anti-rotation element, so that by moving the wedge-shaped section the position of the transfer element relative to the main tool body and relative to the slider element in the axial direction can be adjusted.

In a further preferred embodiment, a fixation element is provided, which is movable between a releasing position and a fixing position. In the fixing position, the fixation element is in contact with the slider element and provides a non-positive connection between the fixation element and the slider element. In the releasing position, no non-positive connection between the fixation element and the slider element is provided. Therefore, in the fixing position any movement between the slider element and the main tool body is prevented.

In particular, in case the slider element is driven by a drive shaft having a threaded portion, there will be a little axial backlash between the drive shaft and the slider element. In order to bring the slider element in a fixed position, a fixation element is used.

After the slider element has been brought into the desired position, the fixation element is pressed against the slider element, so that in the fixing position, the slider element cannot be moved relative to the main tool body by rotation of the drive shaft. If one wishes to bring the slider element in a different position, firstly the fixation element has to be removed, so that secondly the slider element can be moved into the desired position.

For example, this fixation element can press the slider element against the threaded section of the main tool body. Thereafter the slider element cannot be moved in the adjustment direction.

Due to this measure, any machining forces acting on the cutting edge (and therefore also on the slider element) will not act on the drive shaft but are transmitted via the fixation element to the main tool body.

In a further preferred embodiment, the fixation element includes the transfer element and the clamping element, wherein preferably the clamping element is a clamping screw, which is guided in a threaded hole of the main tool body and rests on the transfer element. When the screw is turned, the transfer element is pressed against the slider element, which in turn is pressed against the main tool body in order to provide a non-positive connection between slider element on the one hand and main tool body on the other hand.

In other words, the transfer element together with the clamping element has two functions. A first function is to provide a sealed connection between the coolant channel of the main tool body and the coolant channel of the slider element, and, a second function is to provide clamping of the slider element. The rotation of the clamping screw ensures that the slider element is clamped and that the connection between the coolant channel of the main tool body and of the slider element is sealed.

In a further preferred embodiment, the slider element includes a nozzle element having an external thread inserted in an opening of the coolant channel of the slider element having an internal thread. The nozzle element has an inner channel with a decreasing cross-section in the direction of the coolant flow.

Furthermore, the exterior of the nozzle element includes a threaded section having the external thread and a handling section provided with a non-circular cross-section, for example a hexagonal cross-section, which is intended to provide a target surface for a tool to screw in the nozzle element into the opening. In contrast to the nozzle element of the prior art, the inner channel is protruding over the threaded section and is therefore protruding over the slider element.

Due to this measure the outlet of the nozzle element can be positioned in closer proximity to the cutting edge.

Further advantages, features and possible uses of the present invention will be apparent from the description hereinafter of preferred embodiments and the accompanying figures in which:

DETAILED DESCRIPTION

Figure 1:
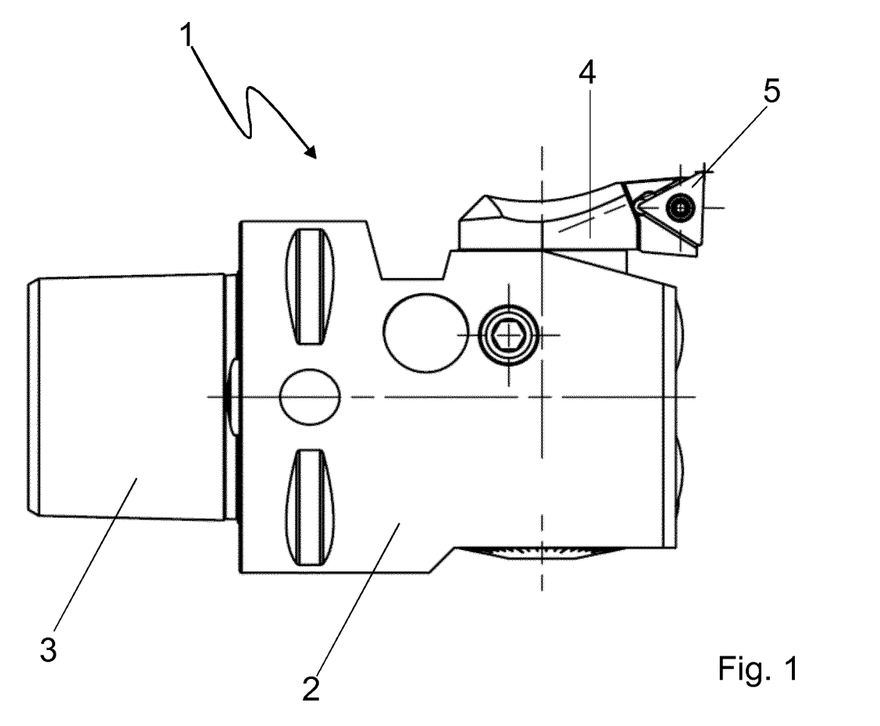
FIG. 1 is a side view of a first embodiment of a metal cutting tool according to the invention.

FIG. 1 is a side view of a first embodiment of the metal cutting tool 1. The metal cutting tool 1 includes a main tool body 2 with a shaft 3 by which the metal cutting tool can be attached to a machine tool. Within the main tool body 2, there is provided a slider element 4, 6 supporting the cutting insert 5 having a cutting edge.

Figure 2:
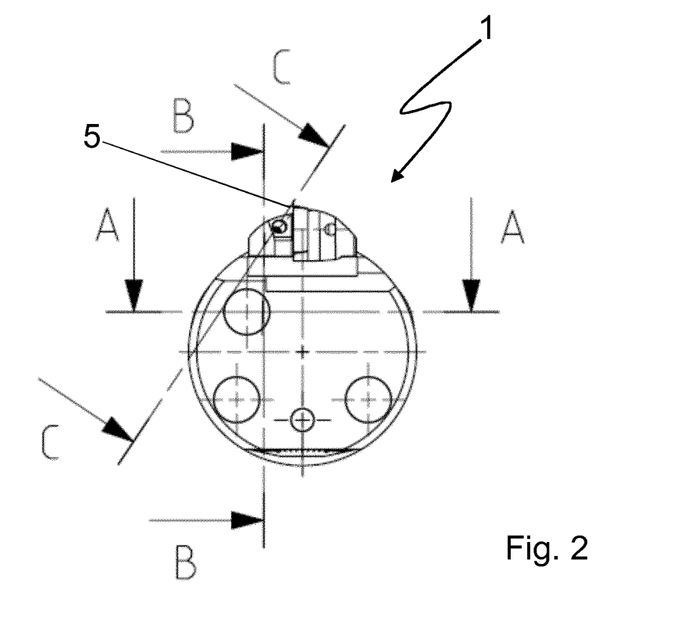
FIG. 2 is a view from below to the embodiment according to FIG. 1.
Figure 3:
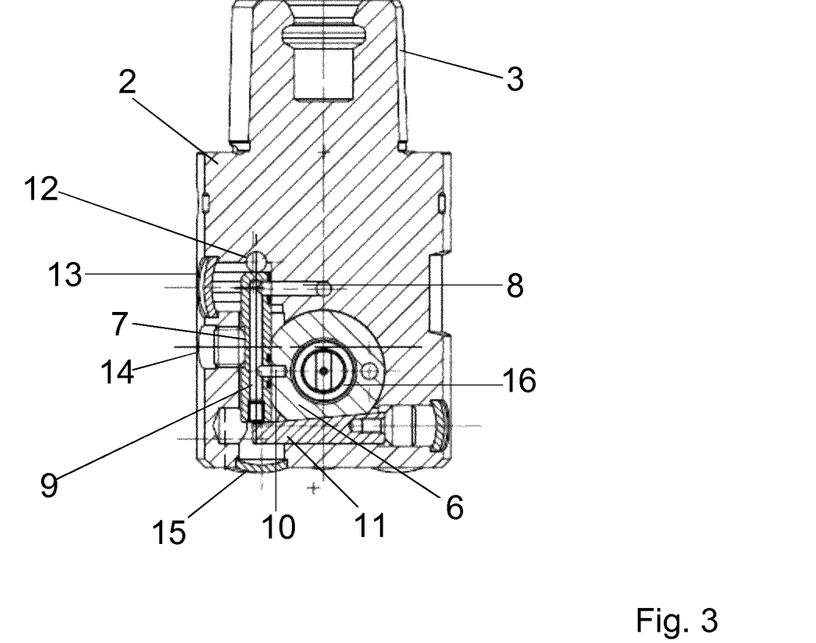
FIG. 3 is a cross-sectional view according to the line A-A in FIG. 2.
Figure 4:
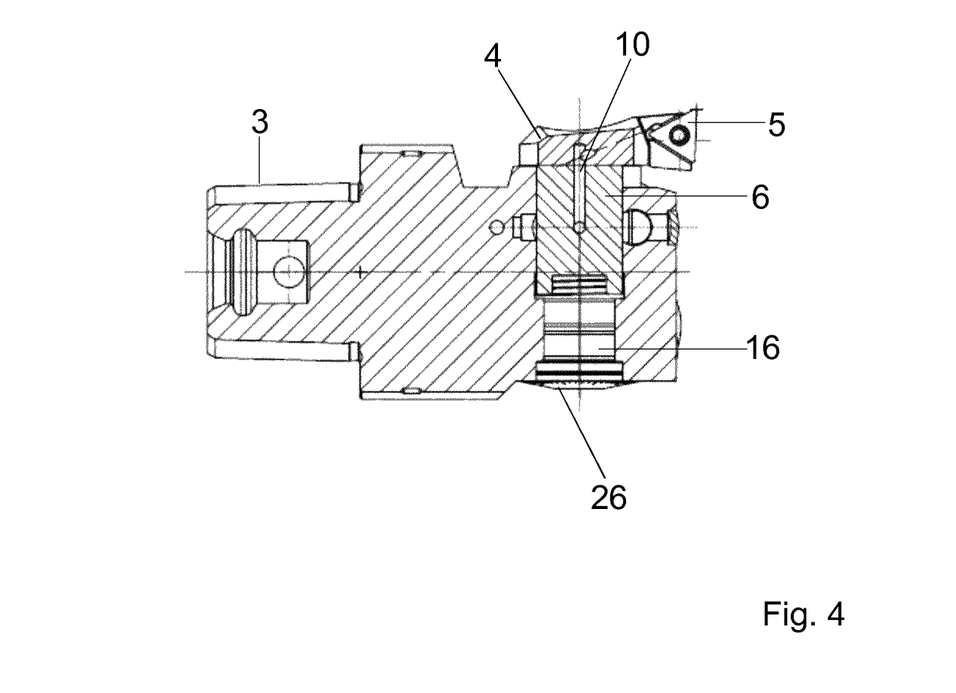
FIG. 4 is a cross-sectional view according to the line B-B in FIG. 2.
Figure 5:
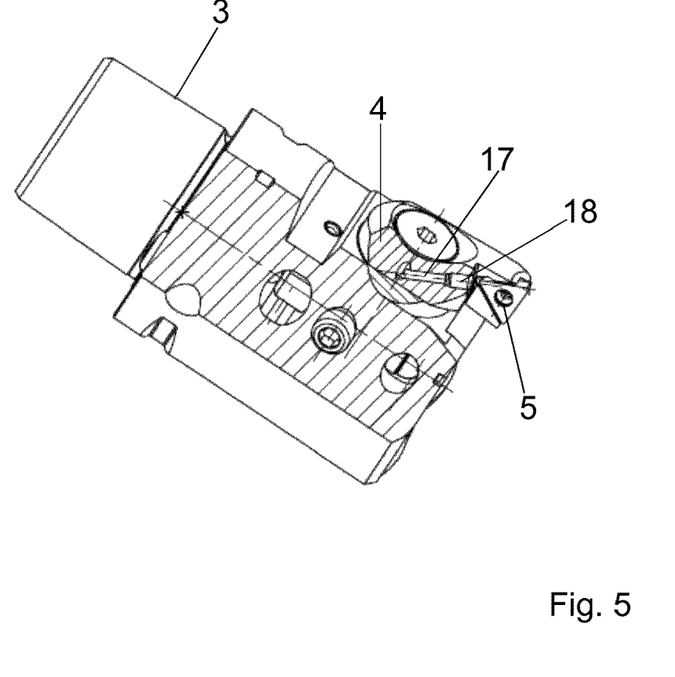
FIG. 5 is a cross-sectional view according to the line C-C in FIG. 2.

FIG. 2 is a bottom view of the embodiment shown in FIG. 1. FIGS. 3-5 are different sectional views along the lines A-A, B-B and C-C, respectively, as defined in FIG. 2. The lines A-A, B-B, and C-C are positioned, so that the coolant channels within the first and the second part of the slider element (FIGS. 3 and 5) and within the transfer element (FIG. 4) can be seen.

As can be seen in FIG. 4, the slider element 4, 6 has two parts, one part 6 is received in an opening of the main tool body 2, wherein the second part 4 is connected with the first part and is supporting a cutting insert 5 having a cutting edge. Furthermore, there is a drive shaft 16 which can be rotated by means of an adjusting screw 26. The drive shaft 16 has two threaded portions, and the first part 6 of the slider element and the main tool body 2 each have a respective threaded portion, wherein the first threaded portion of the drive shaft 16 cooperates with the threaded portion of the slider element 6 and the second threaded portion of the drive shaft 16 cooperates with the threaded portion of the main tool body 2 in such a way that upon rotation of the drive shaft 16 about its axis the slider element 4, 6 can be moved relative to the main body 2 between a first and a second position. In order to prevent a rotation of the first part 6 of the slider element 4, 6 within the opening of the main tool body 2, an anti-rotation element 11 is provided as can be seen in FIG. 3. This anti-rotation element 11 has a wedge-shaped section which gets in contact with a flattened surface of the first part 6 of the slider element 4, 6. Within the main tool body 2, there is provided a coolant channel 8. In order to transfer the coolant from the main tool body 2 into a corresponding coolant channel 10 within the slider element, a transfer element 7 is provided. The transfer element 7 is arranged between a flexible rubber ball 12 and the wedge-shaped section of the anti-rotation element 11.

FIG. 5 is a cross-sectional view along the line C-C of FIG. 2. The second part 4 of the slider element includes an inner coolant channel 17 connected with the inner coolant channel 10 of the first part 6 of the slider element.

Figure 6:
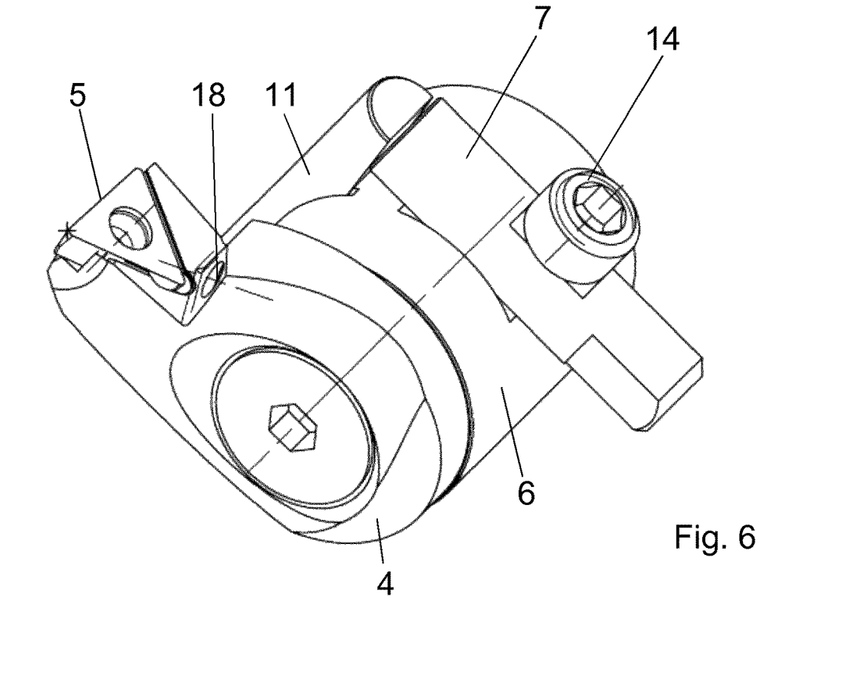
FIG. 6 is a perspective view of the slider element together with the transfer element.
Figure 7:
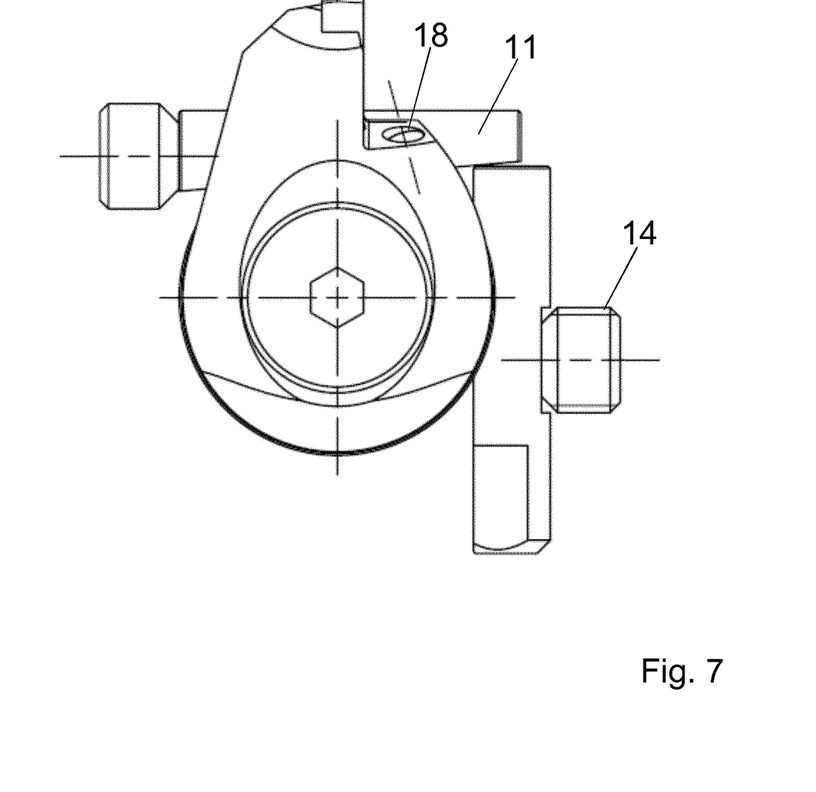
FIG. 7 is a view from above of the slider element.

FIGS. 6 and 7 are a perspective view and a side view of the slider element 4, 6, respectively, with the transfer element 7 and the anti-rotation element 11. As one can see, the first part 6 of the slider element 4, 6 has a flattened section getting in contact with the wedge-shaped section of the anti-rotation element 11 and has a further flattened section getting in contact with the transfer element 11. The transfer element used in this embodiment is shown in FIG. 9 and FIGS. 9a-9c. This transfer element has an inner channel 9, an inlet 23 and an outlet 22. Furthermore, round grooves 19, 20 are surrounding the openings 22, 23. In order to assist the manufacture of the transfer element 7, a bore 21 is provided, through which the channel 9 can be manufactured. After manufacturing and before use, the bore 21 is closed with a corresponding plug.

As can be seen in FIG. 3, the transfer element is connecting the coolant channel 8 of the main tool body 2 with the coolant channel 10 of the slider element 4, 6. In order to provide a sealed connection, O-rings are provided within circular grooves 19, 20. Furthermore, there is provided a clamping screw 14 which rests on the transfer element 7. By rotating the clamping screw 14, the transfer element 7 can be pressed against the main tool body 2 and the slider element 4, so that the O-rings are compressed. As one can see, the clamping screw 14 is positioned closer to the coolant channel 10 of the slider element 4, 6 than to the coolant channel 8 of the main tool body 2 with the result that the larger part of the clamping force will be generated between the transfer element and the slider element. Since in this preferred embodiment the task of the transfer element is not only to provide a sealed connection with the main tool body and the slider element but also to provide a fixation function, in order to prevent any axial movement of the slider element 4, 6 relative to the main tool body 2, it is an advantage, if the larger part of the clamping force is directed via the transfer element to the slider element.

Since the slider element 4, 6 can be moved in a radial direction between two positions and in each position the transfer element 7 shall provide a sealed connection, in this preferred embodiment the outlet 22 is an elongated hole. As an alternative, the diameter of the outlet can be made larger than the diameter of the inlet of the coolant channel of the slider element.

The diameter of the outlet of the transfer element or the extension of the outlet in the adjustment direction is preferably larger than the distance between the first and the second position of the slider element.

To assist the manufacture of this embodiment, the main tool body 2 includes a couple of bores, which can be closed with caps 13, 15 after the transfer element has been positioned within the main tool body 2.

Due to the provision of the transfer element 7, coolant can be transferred from the main tool body 2 into the slider element 4, 6. Within the slider element, the coolant channel 10 is connected with a coolant channel 17 provided in the second part of the slider element 4, 6 which ends in an opening 18 in which a corresponding nozzle can be inserted. The opening 18 is close to the cutting insert 5 and no relative movement between the opening 18 and the cutting insert 5 is possible, so that with a corresponding nozzle inserted into the opening 18, a very effective spray of coolant can be provided. Due to the positioning of the nozzle on the slider element the distance between the cutting edge and the nozzle will not change, when the position of the slider element is changed.

In a first embodiment of the transfer element which is shown in FIGS. 9, 9a-9c, the transfer element is made from a cylindrical bar having a stepped blind bore 21, 9. The outer section 21 of the stepped blind bore is closed with a plug (not shown). The inner section 9 of the stepped blind bore forms an inner coolant channel which is connected with an inlet 23 and an outlet 22. Furthermore, one side 27 of the transfer element 7 is flattened, in order to provide a sealing surface for the connection with the coolant channels 8, 10 in the main tool body 2 and the slider element 4, 6. Furthermore, a flattened section 28 on the opposite side is provided, in order to make available a corresponding support surface for the clamping screw 14. However, due to bore 21, 9 and the flattened parts and sections, the transfer element has to be constructed comparable large, in order to provide enough stability.

In FIGS. 8, 8a-8c a second alternative embodiment of a transfer element 7' is shown. This embodiment can be manufactured by 3D printing.

Figure 8:
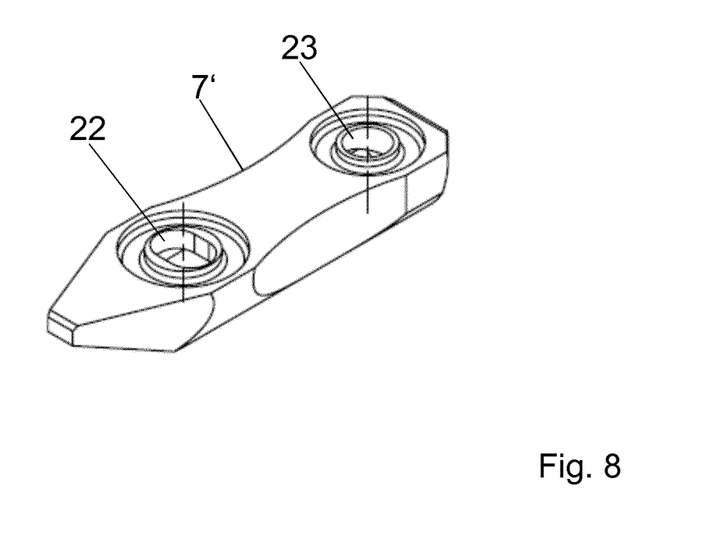
FIG. 8 is a perspective view of a first embodiment of the transfer element.
Figure 8A:
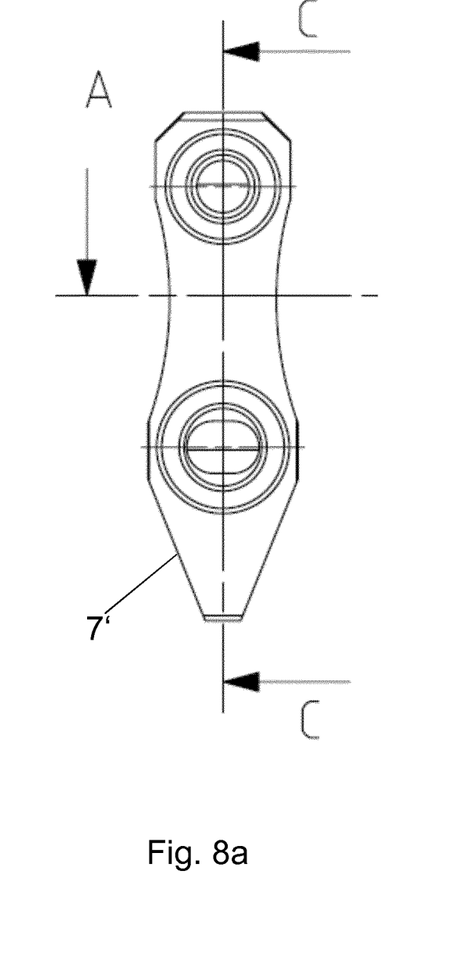
FIGS. 8a-8c are different views of the transfer element shown in FIG. 8.
Figure 8B:
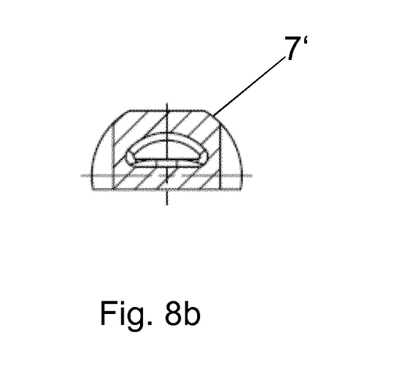
Figure 8C:
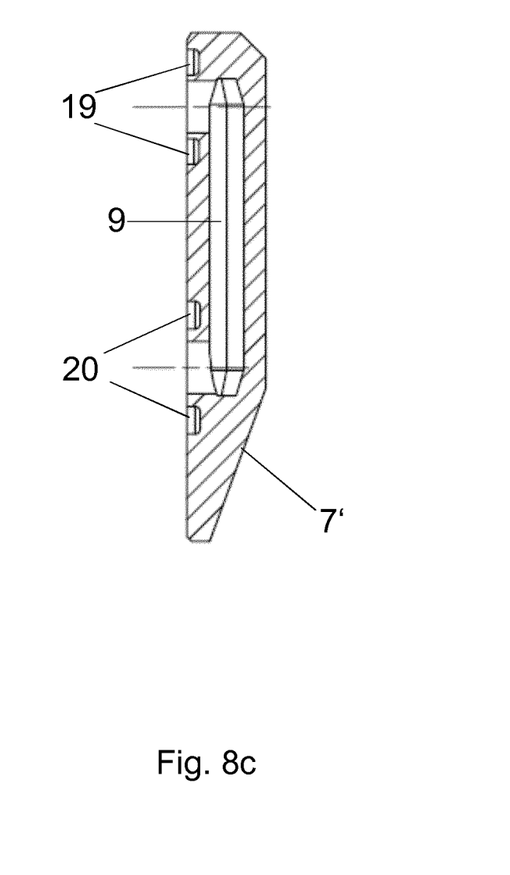
Figure 9:
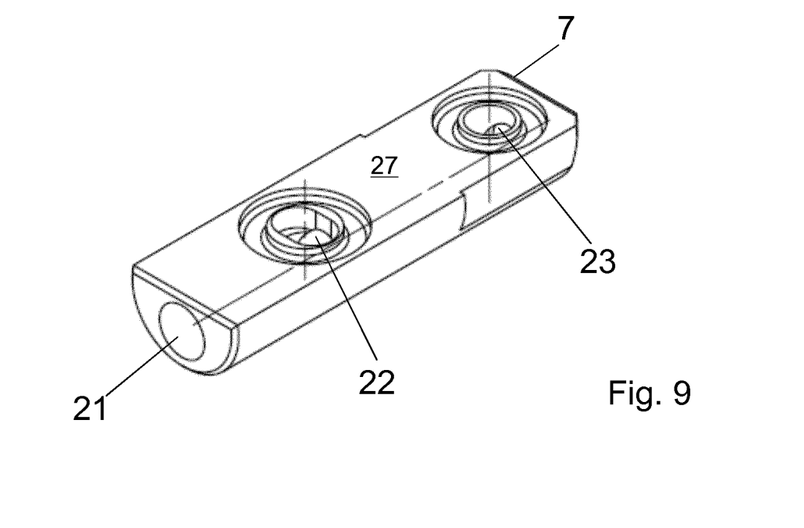
FIG. 9 is a perspective view of a second embodiment of the transfer element.
Figure 9A:
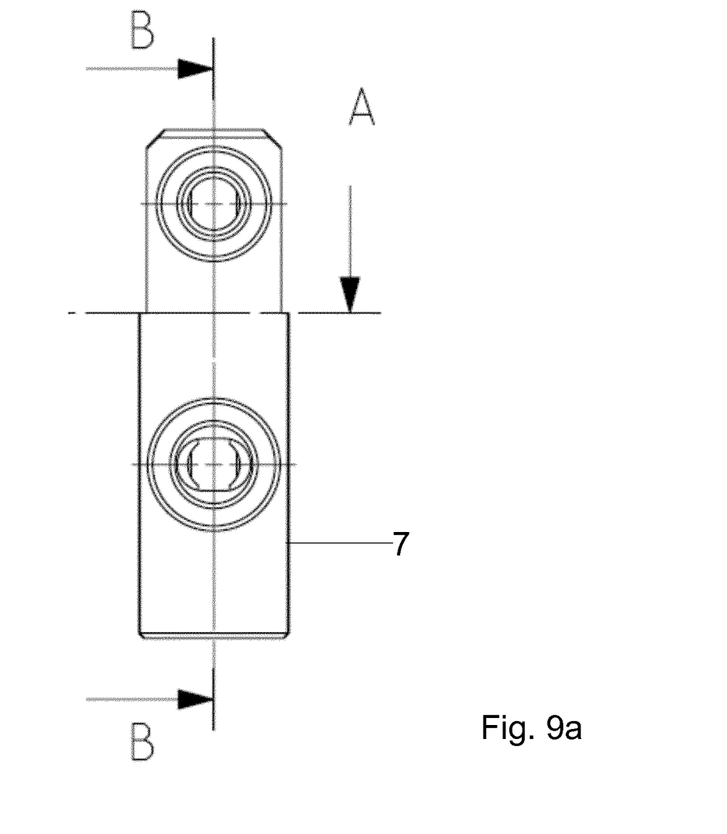
FIGS. 9a-9c show, in different views, the transfer element according to FIG. 9.
Figure 9B:
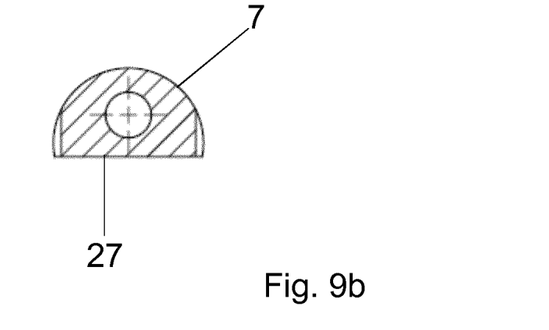
Figure 9C:
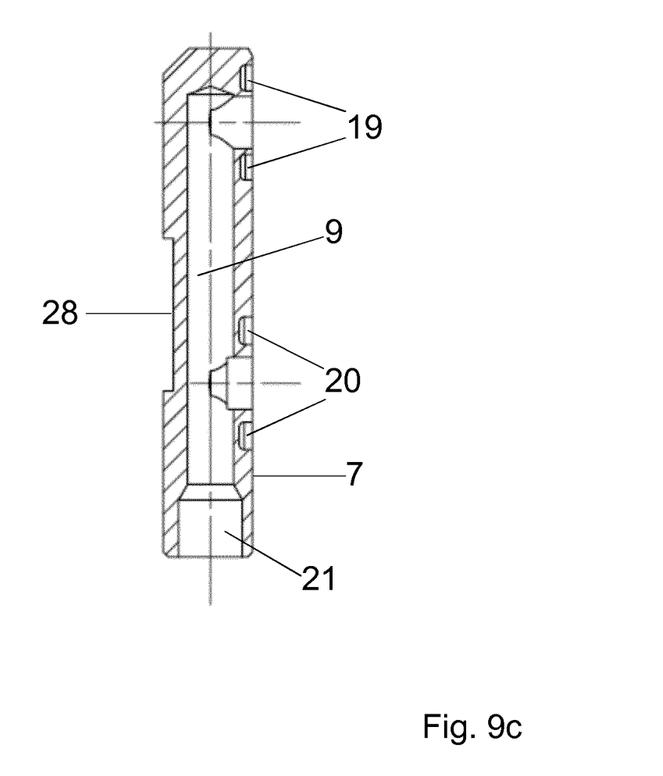

Although the costs for manufacturing this embodiment are slightly higher than for manufacturing the first embodiment of the transfer element, in many cases this embodiment is more suitable, since the transfer element can be constructed smaller, because no blind hole is necessary and the cross-section of the coolant channel 9 within the transfer element 7' must not be circular as can be seen in FIG. 8b.

Figure 10:
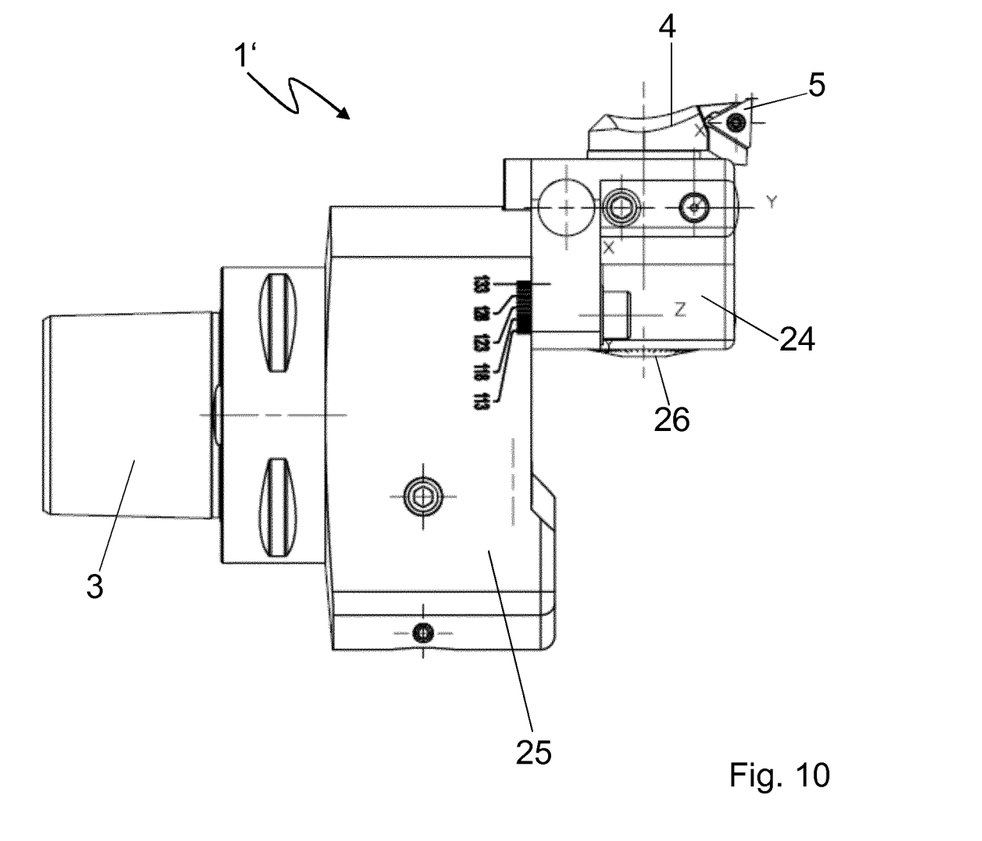
FIG. 10 is a side view of a second inventive embodiment of the machining tool.

In FIG. 10, a side view of a second embodiment of a metal cutting tool 1' is shown. In this embodiment, the main tool body includes two parts 24, 25. The first part 25 has a shaft 3 for a connection with a machine. The second part 24 can be mounted at the first part in at least two different positions. Similar to the previous embodiment, within the second part 24 of the main tool body there is provided a slider element 4, 6 supporting a cutting insert 5.

Figure 11:
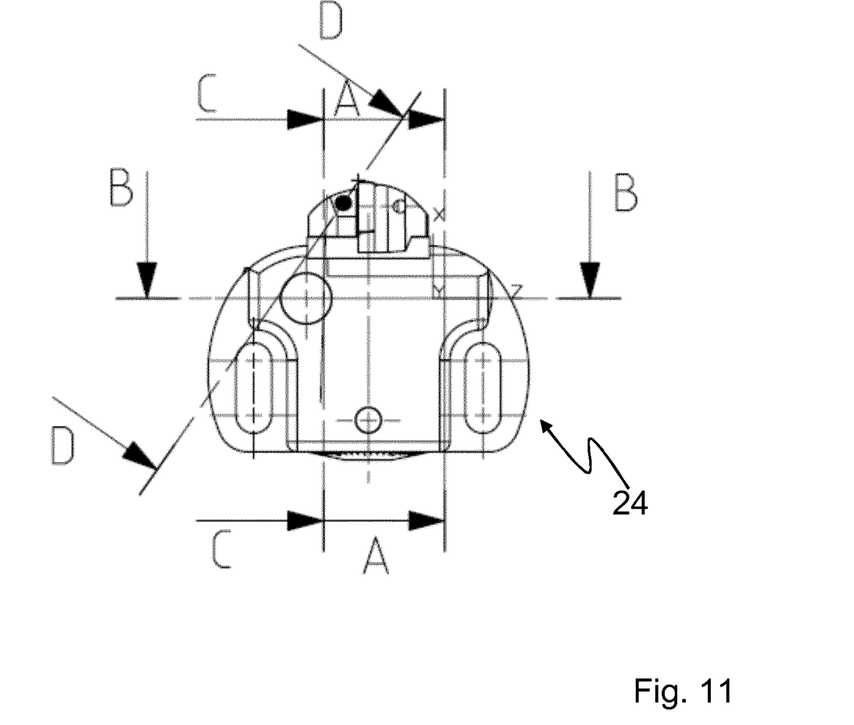
FIG. 11 is a top view to a part of the main tool body of the embodiment of FIG. 10.
Figure 11A:
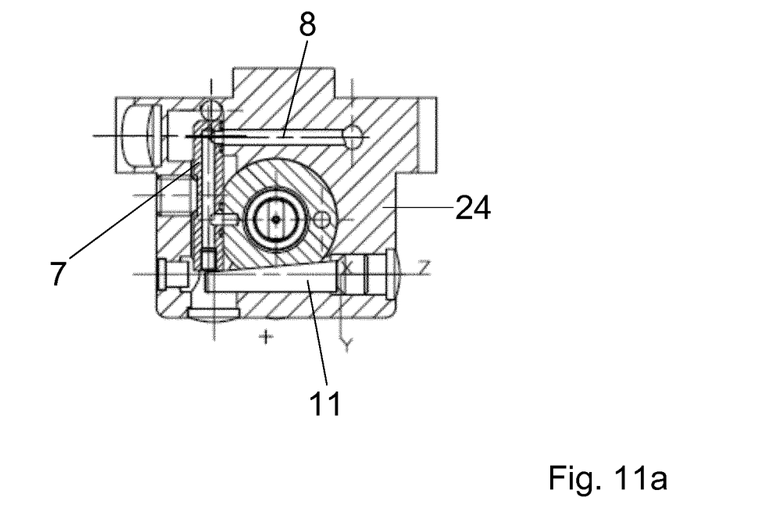
FIG. 11a is a cross-sectional view along the line B-B in FIG. 11.

As can be seen in FIGS. 11 and 11a showing a top view and a cross-sectional view of the first part 24 of the main tool body, a corresponding transfer element 7 is located within the second part 24 of the main tool body. The function of the transfer element 7 is identical to the function of the transfer element 7 in the previous embodiment.

Figure 12A:
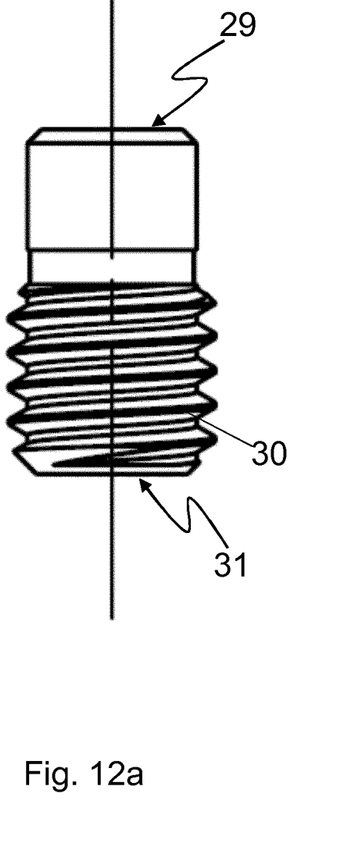
FIGS. 12a-b show nozzle elements of the prior art and in accordance with the present invention.

To direct the coolant efficiently to the cutting edge, it is not unusual to screw in a nozzle into the outlet of the coolant channel. A nozzle of the prior art is shown in FIG. 12a. This known nozzle has an internal channel 29 (not shown) with an decreasing cross-section area, which is expanded at the exhaust opening, to form a hexagonal socket 31 (not shown). On the outside surface of this nozzle, there is provided a threaded section 30. With the help of a corresponding hexagon key the nozzle can be screwed in the outlet of the coolant channel.

Figure 12B:
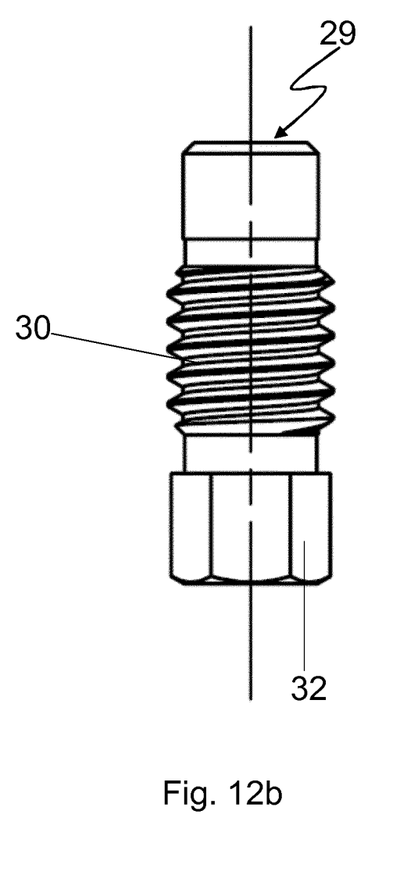

Another embodiment according to the invention is shown in FIG. 12b. This nozzle element has an inner channel 29 (not shown) with a decreasing cross-sectional area in the direction of the coolant flow.

Furthermore, the exterior of the nozzle element includes a threaded section 30 and a handling section provided with an external hex 32. In contrast to the nozzle element of the prior art, the inner channel is protruding over the threaded section and is therefore protruding over the slider element, when the nozzle is inserted into the outlet of the coolant channel of the slider element.

In other words, while in the embodiment shown in FIG. 12a the nozzle outlet is within the nozzle element, since the hexagonal socket is provided inside of the nozzle element, the nozzle outlet can protrude over the slider element in the embodiment shown in FIG. 12a, since there is no hexagonal socket but an external hexagon.

With the present invention an improved coolant supply from the main tool body into the slider element is possible. For assembling the tool, the slider element 4,6 together with the drive shaft 16 is mounted inside the bore of the main tool body 2 (see FIG. 3). In the next step the transfer element 7 is inserted into the appropriate bore so that it touches the rubber ball 12. Then the anti-rotation element 11 is inserted. The anti-rotation element 11 includes a wedge-shaped section and an adjusting screw which engages a threaded section of the main tool body. By rotation the adjusting screw the wedge-shaped section can be moved perpendicular to the tool axis. By movement of the anti-rotation element 11 the wedge-shaped section gets into contact with the first part 6 of the slider element as well as with the transfer element 7. Due to contact with the slider element any rotation of the cylindrical slider element within the main tool body is prevented.

Due to contact with the transfer element 7, the transfer element is moved in an axial direction so that it is pressed against the rubber ball 12. The dimensions of the rubber ball 12, the transfer element 7 and the wedge-shaped section are chosen so that, if the anti-rotation element 11 is in a blocked position in which any rotation of the slider element is prevented, then the transfer element is in a position in which the inlet of the coolant channel of the transfer element and the outlet of the coolant channel of the main tool body as well as the outlet of the coolant channel of the transfer element and the inlet of the coolant channel of the slider element are located opposite to each other, respectively.

In said situation the transfer element lays loose on the slider element and the main tool body so that movement of the slider element in the adjustment direction is still possible. After the slider element has been moved into the desired position in the adjustment direction, the clamping device, namely the clamping screw 14 is turned. Thereby, the transfer element is pressed against the slider element, whereby not only a sealed connection of the coolant channels is established but also the slider element is fixated in order to eliminate any backlash and to unburden the drive shaft during the following machining operation.

If one wants to move the slider element in the adjustment direction, one has firstly to release the clamping device so that the slider element is no more in a fixated state.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A metal cutting tool comprising:
    a main tool body;
    a slider element received at least partially in an opening in the main tool body and movably arranged relative thereto in an adjustment direction between a first and a second position, the slider element including a cutting edge or being arranged to support a cutting insert having a cutting edge, and an internal coolant supply arranged to supply coolant from the main tool body to the cutting edge and having a coolant channel running within the main tool body as well as within the slider element, wherein the main tool body, or a transfer element that has a coolant channel that is part of the internal coolant supply and that is connected with the main tool body, includes a first sealing surface on which an outlet of the coolant channel of the main tool body is arranged, the slider element or the transfer element includes a second sealing surface on which an inlet of the coolant channel of the slider element is arranged, wherein the coolant channel of the transfer element includes an inlet and outlet, the outlet of the transfer element having a different shape and/or size than the inlet of the transfer element;
    a clamping element with which the first and the second sealing surfaces are pressable against each other, whereby a sealed connection between the outlet of the coolant channel of the main tool body and the inlet of the coolant channel of the slider element is provided; and a fixation element movable between a releasing position and a fixing position, wherein in the fixing position the fixation element is in contact with the slider element and provides a non-positive connection between the fixation element and the slider element and wherein in the releasing position no non-positive connection between the fixation element and the slider element is provided, so that in the fixing position any movement between the slider element and the main tool body is prevented, wherein the transfer element together with the clamping element form the fixation element.

2. The metal cutting tool according to claim 1, wherein the main tool body includes the transfer element, the first sealing surface and the outlet of the main tool body being arranged on the transfer element, the outlet of the coolant channel of the transfer element being the outlet of the main tool body, and wherein the inlet of the coolant channel of the transfer element is in connection with the coolant channel of the main tool body.

3. The metal cutting tool according to claim 2, wherein the inlet of the coolant channel of the transfer element is arranged on the first sealing surface, and wherein the clamping element is arranged so that with the clamping element, the first sealing surface is also pressable against the main tool body.

4. The metal cutting tool according to claim 2, wherein a sealing element is arranged between the transfer element and the main tool body and/or between the transfer element and the slider element, wherein the sealing element provides a sealed connection between the inlet of the transfer element and the coolant channel of the main tool body and/or the outlet of the transfer element and the inlet of the coolant channel of the slider element, respectively.

5. The metal cutting tool according to claim 4, wherein the sealing element is at least one O-ring located in a corresponding groove provided on the transfer element and surrounding the outlet.

6. The metal cutting tool according to claim 4, wherein the transfer element is a cylindrical body arranged within an opening of the main tool body, wherein the transfer element has an outer section with a flattened surface forming the first sealing surface, the second sealing surface being a flattened surface located on the slider element, the opening of the main tool body including a corresponding flattened surface, and wherein the flattened surfaces of the transfer element and of the slider element, and the flattened surfaces of the transfer element and the opening of the main tool body are facing each other.

7. The metal cutting tool according to claim 6, wherein the axis of the cylindrical body of the transfer element and the adjustment direction form an angle.

8. The metal cutting tool according to claim 7, wherein the angle is larger than 50°.

9. The metal cutting tool according to claim 1, wherein the main tool body includes a first and second part, wherein the first part of the main tool body has a shaft for connection with a machine and the second part of the main tool body is mountable at the first part of the main tool body in at least two different positions, wherein the coolant channels of the coolant supply run at least within the second part of the main tool body.

10. The metal cutting tool according to claim 1, further comprising a drive shaft having first and second threaded portions, wherein the slider element and the main tool body each have a respective threaded portion, wherein the first threaded portion of the drive shaft cooperates with the threaded portion of the slider element and the second threaded portion of the drive shaft cooperates with the threaded portion of the main body such that when the drive shaft is rotated about its axis the slider element is moved in the adjustment direction relative to the main body between the first and second positions.

11. The metal cutting tool according to claim 10, further comprising an anti-rotation element movable into contact with the slider element to prevent rotation of the slider element within the opening of the main tool body, wherein the anti-rotation element is also arranged as the positioning device, wherein the anti-rotation element includes a wedge-shaped section, and wherein, when the anti-rotation element is moved, the wedge-shaped section is pressed against the transfer element, so that the transfer element is pressed against the elastic element.

12. The metal cutting tool according to claim 1, further comprising a positioning device movably arranged to contact the transfer element, wherein the main tool body includes an elastic element located so that the transfer element is pressed against the elastic element when the positioning device is moved into contact with the transfer element, and wherein the positioning device, the elastic element and the transfer element are dimensioned so that the transfer element is pressable in a positioning direction perpendicular to the adjustment direction against the elastic element.

13. The metal cutting tool according to claim 1, wherein the clamping element is a clamping screw guided in a threaded hole of the main tool body and resting on the transfer element.

14. The metal cutting tool according to claim 1, wherein the slider element includes a nozzle element with an external thread inserted in the coolant channel of the slider element having an internal thread, the nozzle element having an inner channel with a decreasing cross-section.

15. The metal cutting tool according to claim 14, wherein the exterior of the nozzle element includes a threaded section and a handling section provided with a non-circular cross-section, such as a hexagonal cross-section.

16. The metal cutting tool according to claim 1, wherein the metal cutting tool is a boring tool or a milling tool.

* * * * *